US011956615B2

(12) United States Patent
Laitinen et al.

(10) Patent No.: US 11,956,615 B2
(45) Date of Patent: Apr. 9, 2024

(54) SPATIAL AUDIO REPRESENTATION AND RENDERING

(71) Applicant: Nokia Technologies Oy, Espoo (FI)

(72) Inventors: Mikko-Ville Laitinen, Espoo (FI); Lasse Laaksonen, Tampere (FI); Juha Vilkamo, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/909,025

(22) Filed: Jun. 23, 2020

(65) Prior Publication Data

US 2020/0413211 A1 Dec. 31, 2020

(30) Foreign Application Priority Data

Jun. 25, 2019 (GB) ..................................... 1909133

(51) Int. Cl.
*H04S 3/02* (2006.01)
*G10L 19/008* (2013.01)

(52) U.S. Cl.
CPC .............. *H04S 3/02* (2013.01); *G10L 19/008* (2013.01); *H04S 2400/01* (2013.01); *H04S 2420/11* (2013.01)

(58) Field of Classification Search
CPC .... H04S 3/02; H04S 2400/01; H04S 2420/11; G10L 19/008
USPC ...................................................... 381/22, 23
See application file for complete search history.

(56) References Cited

U.S. PATENT DOCUMENTS 9,257,127 B2 2/2016 Beack et al.
2011/0130853 A1* 6/2011 Han .................... H03G 3/3005 700/94
2012/0029916 A1* 2/2012 Tsujikawa ........... G10L 21/0272 704/231
2013/0085750 A1 4/2013 Ozawa
2015/0332680 A1* 11/2015 Crockett ................ G10L 25/18 381/23
2019/0013028 A1* 1/2019 Atti ........................ G10L 19/24

FOREIGN PATENT DOCUMENTS

GB 2554446 A 4/2018
GB 2556093 A 5/2018
WO WO-2008/131903 A1 11/2008
WO WO-2018/060550 A1 4/2018
WO WO-2018/091776 A1 5/2018

OTHER PUBLICATIONS

Juha Vilkamo, Tom Backstrom and Achim Kuntz "Optimized Covariance Domain Framework for Time-Frequency Processing of Spatial Audio" J. Audio Eng. Soc., vol. 61, No. 6, Jun. 2013.

* cited by examiner

*Primary Examiner* — Xu Mei
(74) *Attorney, Agent, or Firm* — Harrington & Smith

(57) ABSTRACT

An apparatus including means configured to: obtain at least one audio stream, wherein the at least one audio stream includes one or more transport audio signals, wherein the one or more transport audio signals is a defined type of transport audio signal; and convert the one or more transport audio signals to at least one or more further transport audio signals, the one or more further transport audio signals being a further defined type of transport audio signal.

19 Claims, 8 Drawing Sheets

SPATIAL AUDIO REPRESENTATION AND RENDERING

FIELD

The present application relates to apparatus and methods for spatial audio representation and rendering, but not exclusively for audio representation for an audio decoder.

BACKGROUND

Immersive audio codecs are being implemented supporting a multitude of operating points ranging from a low bit rate operation to transparency. An example of such a codec is the Immersive Voice and Audio Services (IVAS) codec which is being designed to be suitable for use over a communications network such as a 3GPP 4G/5G network including use in such immersive services as for example immersive voice and audio for virtual reality (VR). This audio codec is expected to handle the encoding, decoding and rendering of speech, music and generic audio. It is furthermore expected to support channel-based audio and scene-based audio inputs including spatial information about the sound field and sound sources. The codec is also expected to operate with low latency to enable conversational services as well as support high error robustness under various transmission conditions.

Input signals can be presented to the IVAS encoder in one of a number of supported formats (and in some allowed combinations of the formats). For example a mono audio signal (without metadata) may be encoded using an Enhanced Voice Service (EVS) encoder. Other input formats may utilize new IVAS encoding tools. One input format proposed for IVAS is the Metadata-assisted spatial audio (MASA) format, where the encoder may utilize, e.g., a combination of mono and stereo encoding tools and metadata encoding tools for efficient transmission of the format. MASA is a parametric spatial audio format suitable for spatial audio processing. Parametric spatial audio processing is a field of audio signal processing where the spatial aspect of the sound (or sound scene) is described using a set of parameters. For example, in parametric spatial audio capture from microphone arrays, it is a typical and an effective choice to estimate from the microphone array signals a set of parameters such as directions of the sound in frequency bands, and the relative energies of the directional and non-directional parts of the captured sound in frequency bands, expressed for example as a direct-to-total ratio or an ambient-to-total energy ratio in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

For example, there can be two channels (stereo) of audio signals and spatial metadata. The spatial metadata may furthermore define parameters such as: Direction index, describing a direction of arrival of the sound at a time-frequency parameter interval; Direct-to-total energy ratio, describing an energy ratio for the direction index (i.e., time-frequency subframe); Spread coherence describing a spread of energy for the direction index (i.e., time-frequency subframe); Diffuse-to-total energy ratio, describing an energy ratio of non-directional sound over surrounding directions; Surround coherence describing a coherence of the non-directional sound over the surrounding directions; Remainder-to-total energy ratio, describing an energy ratio of the remainder (such as microphone noise) sound energy to fulfil requirement that sum of energy ratios is 1; and Distance, describing a distance of the sound originating from the direction index (i.e., time-frequency subframes) in meters on a logarithmic scale.

The IVAS stream can be decoded and rendered to a variety of output formats, including binaural, multichannel, and Ambisonic (FOA/HOA) outputs. In addition, there can be an interface for external rendering, where the output format(s) can correspond, e.g., to the input formats.

As the spatial (for example MASA) metadata depicts the desired spatial audio perception in an output-format-agnostic manner, any stream with spatial metadata can be flexibly rendered to any of the aforementioned output formats. However, as the MASA stream can originate from a variety of inputs, the transport audio signals, that the decoder receives, may have different characteristics. Hence a decoder has to take these aspects into account in order to be able to produce optimal audio quality.

Immersive media technologies are currently being standardised by MPEG under the name MPEG-I. These technologies include methods for various virtual reality (VR), augmented reality (AR) or mixed reality (MR) use cases. MPEG-I is divided into three phases: Phases 1a, 1b, and 2. The phases are characterized by how the so-called degrees of freedom in 3D space are considered. Phases 1a and 1b consider 3DoF and 3DoF+ use cases, and Phase 2 will then allow at least significantly unrestricted 6DoF.

An example of an augmented reality (AR)/virtual reality (VR)/mixed reality (MR) application is an audio (or audio-visual) environment immersion where 6 degrees of freedom (6DoF) content rendering is implemented.

It is currently foreseen that MPEG-I audio will be based on MPEG-H 3D Audio. However additional 6DoF technology is needed on top of MPEG-H 3D Audio, including at least: additional metadata to support 6DoF and interactive 6DoF renderer supporting also linear translation. It is noted that MPEG-H 3D Audio includes, and MPEG-I Audio is expected to support, Ambisonics signals. MPEG-I will also include support for a low-delay communications audio, e.g., for use cases such as social VR. This audio may be spatial. It has not yet been defined how this is to be rendered to the user (e.g., format support, mixing with the native MPEG-I content). It is at least expected that there will be some metadata support to control the mixing of the at least two contents.

SUMMARY

There is provided according to a first aspect an apparatus comprising means configured to: obtain at least one audio stream, wherein the at least one audio stream comprises one or more transport audio signals, wherein the one or more transport audio signals is a defined type of transport audio signal; and convert the one or more transport audio signals to at least one or more further transport audio signals, the one or more further transport audio signals being a further defined type of transport audio signal.

The defined type of transport audio signal and/or further defined type of transport audio signal may be associated with an origin of the transport audio signal or simulated origin of the transport audio signal.

The means may be further configured to obtain an indicator representing the further defined type of transport audio signal, and wherein the means configured to convert the one or more transport audio signals to at least one or more further transport audio signals, the one or more further transport audio signals may be a further defined type of transport audio signal is configured to convert the one or more transport audio signals to at least one or more further transport audio signals based on the indicator.

The indicator may be obtained from a renderer configured to receive the one or more further transport audio signals and render the one or more further transport audio signals.

The means may be further configured to provide the at least one further transport audio signal for rendering.

The means may be further configured to: generate an indicator associated with the further defined type of transport audio signal; and provide the indicator associated with the at least one further transport audio signal as additional metadata with the at least one further transport audio signal for the rendering.

The means may be further configured to determine the defined type of transport audio signal.

The at least one audio stream may further comprise an indicator identifying the defined type of transport audio signal associated with the one or more transport audio signals, wherein the means configured to determine the defined type of transport audio signal may be configured to determine the defined type of transport audio signal associated with the one or more transport audio signals based on the indicator.

The means configured to determine the defined type of transport audio signal may be configured to determine the defined type of transport audio signal based on an analysis of the one or more transport audio signals.

The means configured to convert the one or more transport audio signals to at least one or more further transport audio signals, the one or more further transport audio signals being a further defined type of transport audio signal may be configured to: generate at least one prototype signal based on the at least one transport audio signal, the defined type of the transport audio signal and the further defined type of the transport audio signal; determine at least one desired one or more further transport audio signal property; mix the at least one prototype signal and a decorrelated version of the at least one prototype signal based on the determined at least one desired one or more further transport audio signal property to generate the least one further audio signal.

The defined type of the at least one audio signal may be at least one of: a capture microphone arrangement; a capture microphone separation distance; a capture microphone parameter; a transport channel identifier; a cardioid audio signal type; a spaced audio signal type; a downmix audio signal type; a coincident audio signal type; and a transport channel arrangement.

The means may be further configured to render the one or more further transport audio signal.

The means configured to render the at least one further audio signal may be configured to perform one of: convert the one or more further transport audio signal into an Ambisonic audio signal representation; convert the one or more further transport audio signal into a binaural audio signal representation; and convert the one or more further transport audio signal into a multichannel audio signal representation.

The at least one audio stream may comprise spatial metadata associated with the one or more transport audio signals.

The means may further be configured to provide the at least one further transport audio signal and spatial metadata associated with the one or more transport audio signals for rendering.

According to a second aspect there is provided a method comprising: obtaining at least one audio stream, wherein the at least one audio stream comprises one or more transport audio signals, wherein the one or more transport audio signals is a defined type of transport audio signal; and converting the one or more transport audio signals to at least one or more further transport audio signals, the one or more further transport audio signals being a further defined type of transport audio signal.

The defined type of transport audio signal and/or further defined type of transport audio signal may be associated with an origin of the transport audio signal or simulated origin of the transport audio signal.

The method may further comprise obtaining an indicator representing the further defined type of transport audio signal, and wherein converting the one or more transport audio signals to at least one or more further transport audio signals, the one or more further transport audio signals being a further defined type of transport audio signal may comprise converting the one or more transport audio signals to at least one or more further transport audio signals based on the indicator.

The indicator may be obtained from a renderer configured to receive the one or more further transport audio signals and render the one or more further transport audio signals.

The method may further comprise providing the at least one further transport audio signal for rendering.

The method may further comprise: generating an indicator associated with the further defined type of transport audio signal; and providing the indicator associated with the at least one further transport audio signal as additional metadata with the at least one further transport audio signal for the rendering.

The method may further comprise determining the defined type of transport audio signal.

The at least one audio stream may further comprise an indicator identifying the defined type of transport audio signal associated with the one or more transport audio signals, wherein determining the defined type of transport audio signal comprises determining the defined type of transport audio signal associated with the one or more transport audio signals based on the indicator.

Determining the defined type of transport audio signal may comprise determining the defined type of transport audio signal based on an analysis of the one or more transport audio signals.

Converting the one or more transport audio signals to at least one or more further transport audio signals, the one or more further transport audio signals being a further defined type of transport audio signal may comprise: generating at least one prototype signal based on the at least one transport audio signal, the defined type of the transport audio signal and the further defined type of the transport audio signal; determining at least one desired one or more further transport audio signal property; mixing the at least one prototype signal and a decorrelated version of the at least one prototype signal based on the determined at least one desired one or more further transport audio signal property to generate the least one further audio signal.

The defined type of the at least one audio signal may be at least one of: a capture microphone arrangement; a capture microphone separation distance; a capture microphone parameter; a transport channel identifier; a cardioid audio signal type; a spaced audio signal type; a downmix audio signal type; a coincident audio signal type; and a transport channel arrangement.

The method may further comprise rendering the one or more further transport audio signal.

Rendering the at least one further audio signal may comprise one of: converting the one or more further transport audio signal into an Ambisonic audio signal representation; converting the one or more further transport audio signal into a binaural audio signal representation; and converting the one or more further transport audio signal into a multichannel audio signal representation.

The at least one audio stream may comprise spatial metadata associated with the one or more transport audio signals.

The method may further comprise providing the at least one further transport audio signal and spatial metadata associated with the one or more transport audio signals for rendering.

According to a third aspect there is provided an apparatus comprising at least one processor and at least one memory including a computer program code, the at least one memory and the computer program code configured to, with the at least one processor, cause the apparatus at least to: obtain at least one audio stream, wherein the at least one audio stream comprises one or more transport audio signals, wherein the one or more transport audio signals is a defined type of transport audio signal; and convert the one or more transport audio signals to at least one or more further transport audio signals, the one or more further transport audio signals being a further defined type of transport audio signal.

The defined type of transport audio signal and/or further defined type of transport audio signal may be associated with an origin of the transport audio signal or simulated origin of the transport audio signal.

The apparatus may be further caused to obtain an indicator representing the further defined type of transport audio signal, and wherein the apparatus caused to convert the one or more transport audio signals to at least one or more further transport audio signals, the one or more further transport audio signals may be a further defined type of transport audio signal may be caused to convert the one or more transport audio signals to at least one or more further transport audio signals based on the indicator.

The indicator may be obtained from a renderer configured to receive the one or more further transport audio signals and render the one or more further transport audio signals.

The apparatus may be further caused to provide the at least one further transport audio signal for rendering.

The apparatus may be further caused to: generate an indicator associated with the further defined type of transport audio signal; and provide the indicator associated with the at least one further transport audio signal as additional metadata with the at least one further transport audio signal for the rendering.

The apparatus may be further caused to determine the defined type of transport audio signal.

The at least one audio stream may further comprise an indicator identifying the defined type of transport audio signal associated with the one or more transport audio signals, wherein the apparatus caused to determine the defined type of transport audio signal may be caused to determine the defined type of transport audio signal associated with the one or more transport audio signals based on the indicator.

The apparatus caused to determine the defined type of transport audio signal may be caused to determine the defined type of transport audio signal based on an analysis of the one or more transport audio signals.

The apparatus caused to convert the one or more transport audio signals to at least one or more further transport audio signals, the one or more further transport audio signals being a further defined type of transport audio signal may be caused to: generate at least one prototype signal based on the at least one transport audio signal, the defined type of the transport audio signal and the further defined type of the transport audio signal; determine at least one desired one or more further transport audio signal property; mix the at least one prototype signal and a decorrelated version of the at least one prototype signal based on the determined at least one desired one or more further transport audio signal property to generate the least one further audio signal.

The defined type of the at least one audio signal may be at least one of: a capture microphone arrangement; a capture microphone separation distance; a capture microphone parameter; a transport channel identifier; a cardioid audio signal type; a spaced audio signal type; a downmix audio signal type; a coincident audio signal type; and a transport channel arrangement.

The apparatus may be further caused to render the one or more further transport audio signal.

The apparatus caused to render the at least one further audio signal may be caused to perform one of: convert the one or more further transport audio signal into an Ambisonic audio signal representation; convert the one or more further transport audio signal into a binaural audio signal representation; and convert the one or more further transport audio signal into a multichannel audio signal representation.

The at least one audio stream may comprise spatial metadata associated with the one or more transport audio signals.

The apparatus may further be caused to provide the at least one further transport audio signal and spatial metadata associated with the one or more transport audio signals for rendering.

According to a fourth aspect there is provided an apparatus comprising: means for obtaining at least one audio stream, wherein the at least one audio stream comprises one or more transport audio signals, wherein the one or more transport audio signals is a defined type of transport audio signal; and means for converting the one or more transport audio signals to at least one or more further transport audio signals, the one or more further transport audio signals being a further defined type of transport audio signal.

According to a fifth aspect there is provided a computer program comprising instructions [or a computer readable medium comprising program instructions] for causing an apparatus to perform at least the following: obtaining at least one audio stream, wherein the at least one audio stream comprises one or more transport audio signals, wherein the one or more transport audio signals is a defined type of transport audio signal; and converting the one or more transport audio signals to at least one or more further transport audio signals, the one or more further transport audio signals being a further defined type of transport audio signal.

According to a sixth aspect there is provided a non-transitory computer readable medium comprising program instructions for causing an apparatus to perform at least the following: obtaining at least one audio stream, wherein the at least one audio stream comprises one or more transport audio signals, wherein the one or more transport audio signals is a defined type of transport audio signal; and converting the one or more transport audio signals to at least one or more further transport audio signals, the one or more further transport audio signals being a further defined type of transport audio signal.

According to a seventh aspect there is provided an apparatus comprising: obtaining circuitry configured to obtain at least one audio stream, wherein the at least one audio stream comprises one or more transport audio signals, wherein the one or more transport audio signals is a defined type of transport audio signal; and converting circuitry configured to convert the one or more transport audio signals to at least one or more further transport audio signals, the one or more further transport audio signals being a further defined type of transport audio signal.

According to an eighth aspect there is provided a computer readable medium comprising program instructions for causing an apparatus to perform at least the following: obtaining at least one audio stream, wherein the at least one audio stream comprises one or more transport audio signals, wherein the one or more transport audio signals is a defined type of transport audio signal; and converting the one or more transport audio signals to at least one or more further transport audio signals, the one or more further transport audio signals being a further defined type of transport audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
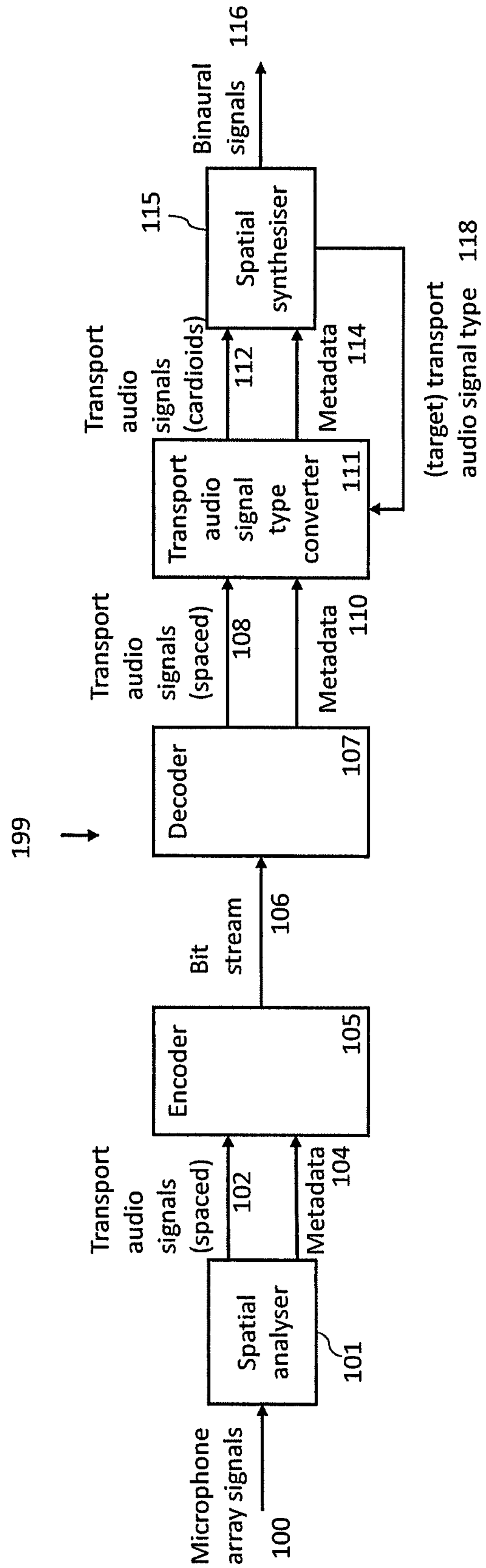
FIG. 1 shows schematically a system of apparatus suitable for implementing some embodiments.

The following describes in further detail suitable apparatus and possible mechanisms for the provision of efficient rendering of spatial metadata assisted audio signals.

Although the following examples focus on MASA encoding and decoding, it should be noted that the presented methods are applicable to any system that utilizes transport audio signals and spatial metadata. The spatial metadata may include, e.g., some of the following parameters in any kind of combination: Directions; Level/phase differences; Direct-to-total-energy ratios; Diffuseness; Coherences (such as spread and/surrounding coherences); and Distances. Typically, the parameters are given in the time-frequency domain. Hence, when in the following the terms IVAS and/or MASA are used, it should be understood that they can be replaced with any other suitable codec and/or metadata format and/or system.

As discussed previously the IVAS codec is expected to be able to handle MASA streams with different kinds of transport audio signals. However, IVAS is also expected to support external renderers. In such circumstances it cannot be guaranteed that all external renderers support MASA streams with all possible transport audio signal types and thus cannot be optimally utilized with an external renderer.

For example, an external renderer may utilize an Ambisonics-based binaural rendering where it is assumed that the transport signal type is cardioids, and from cardioids it is possible with sum and difference operations to directly generate the W and Y components of the Ambisonic signals. Thus, if the transport signal type is not cardioids, such spatial audio stream cannot be directly used with that kind of external renderer.

Moreover, the MASA stream (or any other spatial audio stream constituting of transport audio signals and spatial metadata) may be used outside of the IVAS codec.

The concept as discussed in the following embodiments is apparatus and methods that can modify the transport audio signals so that they match a target type and can thus be used more flexibly.

The embodiments as discussed herein in further detail thus relate to processing of spatial audio streams (containing transport audio signal(s) and metadata). Furthermore these embodiments discuss apparatus and methods for changing the transport audio signal type of the spatial audio stream for achieving compatibility with systems requiring a specific transport audio signal type. Furthermore in these embodiments the transport audio signal type can be changed by obtaining a spatial audio stream; determining the transport audio signal type of the spatial audio stream; obtaining the target transport audio signal type; modifying the transport audio signal(s) to match the target transport audio signal type; changing the transport audio signal type field of the spatial audio stream to the target transport audio signal type (if such field exists); and allowing the modified spatial audio stream to be processed with a system requiring a specific transport audio signal type.

In the following embodiments the apparatus and methods enable the change of type of a spatial audio stream transport audio signal. Hence, spatial audio streams can be converted to be compatible with systems that allow using spatial audio streams with certain kinds of transport audio signal types. The apparatus and methods may, for example, render binaural (or multichannel loudspeaker) audio using the spatial audio stream.

In some embodiments the methods and apparatus could, for example, be implemented in the context of IVAS (e.g., in a mobile device supporting IVAS). The embodiments may be utilized in between an IVAS decoder and an external renderer (e.g., a binaural renderer). In some embodiments where the external renderer supports only a certain transport audio signal type, the embodiments can be configured to modify spatial audio streams with a different transport audio signal type to match the supported transport audio signal type.

The types of the transport audio signal type may be types such as described in GB patent application number GB1904261.3. These can include types such as "spaced", "cardioid", "coincident".

With respect to FIG. 1 an example apparatus and system for implementing audio capture and rendering are shown according to some embodiments (and converting a spatial audio stream with a "spaced" type to a "cardioids" type of transport audio signal).

The system 199 is shown with a microphone array audio signals 100 input. In the following examples a microphone array audio signals 100 input is described, however any suitable multi-channel input (or synthetic multi-channel) format may be implemented in other embodiments.

The system 199 may comprise a spatial analyser 101. The spatial analyser 101 is configured to perform spatial analysis on the microphone signals, yielding transport audio signals 102 and metadata 104.

In some embodiments the spatial analyser and the spatial analysis may be implemented external to the system 199. For example in some embodiments the spatial metadata associated with the audio signals may be provided to an encoder as a separate bit-stream. In some embodiments the spatial metadata may be provided as a set of spatial (direction) index values.

The spatial analyser 101 may be configured to create the transport audio signals 102 in any suitable manner. For example in some embodiments the spatial analyser is configured to select two microphone signals to be used as the transport audio signals. For example the selected two microphone audio signals can be one at the left side of the mobile device and another at the right side of the mobile device. Hence, the transport audio signals can be considered to be spaced microphone signals. In addition, typically, some pre-processing is applied on the microphone signals (such as equalization, noise reduction and automatic gain control).

The metadata can be of various forms and can contain spatial metadata and other metadata. A typical parameterization for the spatial metadata is one direction parameter in each frequency band θ(k,n) and an associated direct-to-total energy ratio in each frequency band r(k,n), where k is the frequency band index and n is the temporal frame index. Determining or estimating the directions and the ratios depends on the device or implementation from which the audio signals are obtained. For example the metadata may be obtained or estimated using spatial audio capture (SPAC) using methods described in GB Patent Application Number 1619573.7 and PCT Patent Application Number PCT/FI2017/050778 In other words, in this particular context, the spatial audio parameters comprise parameters which aim to characterize the sound-field. In some embodiments the parameters generated may differ from frequency band to frequency band. Thus for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons.

In some embodiments the obtained metadata may contain metadata other than the spatial metadata. For example in some embodiments the obtained metadata can be a "Channel audio format" parameter that describes the transport audio signal type. In this example the "channel audio format" parameter may have the value of "spaced". In addition, in some embodiments the metadata further comprises a parameter defining or representing a distance between the microphones. In some embodiments this distance parameter can be signalled. The transport audio signals and the metadata can be in a MASA arrangement or configuration or in any other suitable form The transport audio signals (of type "spaced") 102 and the metadata 104 can be output from the spatial analyser 101 to the encoder 105.

In some embodiments the system 199 comprises an encoder 105. The encoder 105 can be configured to receive the transport audio signals (of type "spaced") 102 and the metadata 104 from the spatial analyser 101. The encoder 105 can in some embodiments be a mobile device, user equipment, tablet computer, computer (running suitable software stored on memory and on at least one processor), or alternatively a specific device utilizing, for example, FPGAs or ASICs. The encoder can be configured to implement any suitable encoding scheme. The encoder 105 may furthermore be configured to receive the metadata and generate an encoded or compressed form of the information. In some embodiments the encoder 105 may further interleave, multiplex to a single data stream 106 or embed the metadata within encoded audio signals before transmission or storage. The multiplexing may be implemented using any suitable scheme.

The encoder could be an IVAS encoder, or any other suitable encoder. The encoder 105 thus is configured to encode the audio signals and the metadata and form a bit stream 106 (e.g., an IVAS bit stream).

The system 199 furthermore may comprise a decoder 107. The decoder 107 is configured to receive, retrieve or otherwise obtain the bitstream 106, and from the bitstream demultiplex the encoded streams and decode the audio signals to obtain the transport signals 108. Similarly the decoder 107 may be configured to receive and decode the encoded metadata 110. The decoder 107 can in some embodiments be a mobile device, user equipment, tablet computer, computer (running suitable software stored on memory and on at least one processor), or alternatively a specific device utilizing, for example, FPGAs or ASICs.

The system 199 may further comprise a signal type converter 111. The transport signal type converter 111 may be configured to obtain the transport audio signals (of type "spaced" in this example) 108 and the metadata 110 and furthermore receive a "target" transport audio signal type input 118 from a spatial synthesizer 115. The transport signal type converter 111 can be configured to convert the input transport signal type into a "target" transport signal type based on the received transport audio signal type 118 indicator from the spatial synthesizer 115. In some embodiments the signal type converter 111 is configured to convert the input or original transport audio signals based on the (spatial) metadata, the input transport audio signal type and the target transport audio signal type so that the new transport audio signals match the target transport audio signal type. In some embodiments the (spatial) metadata is not used in the conversion. For example a FOA transport audio signals to cardioid transport audio signals conversion could be implemented with linear operations without any (spatial) metadata. In some embodiments the signal type converter is configured to convert the input or original transport audio signals without an explicitly received target transport audio signal type.

In this example the aim is to render spatial audio (e.g., binaural audio) with these signals using the spatial synthesizer 115. However, the spatial synthesizer 115 in this example accepts only spatial audio streams in which the transport audio signals are of type "cardioids". In other words the spatial synthesizer expects for example two coincident cardioids pointing to ±90 degrees and is configured to process any two-signal input accordingly. Hence, the spatial audio stream from the decoder cannot be used directly to achieve a correct rendering, but, instead, the transport audio signal type converter 111 is used between the decoder 107 and the spatial synthesizer 115.

In this example, the "target" type is coincident cardioids pointing to ±90 degrees (this is merely an example, it could be any kind of type). In addition, if the metadata has a field describing the transport audio signal type (e.g., a channel audio format metadata parameter), it can be configured to change this indicator or parameter to indicate the new transport audio signal type (e.g., "cardioids").

The modified transport audio signals (for example type "cardioids") 112 and (possibly) modified metadata 114 are forwarded to a spatial synthesizer 115.

In some embodiments the system 199 comprises a spatial synthesizer 115 which is configured to receive the (modified) transport audio signals (in this example of the type "cardioids") 112 and (possibly) modified metadata 114. From this as the transport audio signals are of the supported type, the spatial synthesizer 115 can be configured to render spatial audio (e.g., binaural audio) using the spatial audio stream it received.

In some embodiments the spatial synthesizer 115 is configured to create First order Ambisonics (FOA) signals. W and Y are obtained linearly from the transport audio signals (which are of the type "cardioids") by $$W(b,n)=S_{card,left}(b,n)+S_{card,right}(b,n)$$

$$Y(b,n)=S_{card,left}(b,n)-S_{card,right}(b,n)$$

The spatial synthesizer 115 in some embodiments can be configured to generate X and Z dipoles from the omnidirectional signal W using a suitable parametric processing process such as discussed in GB patent application 1616478.2 and PCT patent application PCT/FI2017/050664. The index b indicates the frequency bin index of the applied time-frequency transform, and n indicates the time index.

The spatial synthesizer 115 can then in some embodiments be configured to generate or synthesize binaural signals from the FOA signals (W, Y, Z, X). This can be realized by applying to the FOA signal in the frequency domain a static matrix operation that has been designed (for each frequency bin) to approximate a head related transform function (HRTF) data set for FOA input. In some embodiments the FOA to HRTF transform can be in a form of a matrix of filters. In some embodiments prior to the matrix operation (or filtering) there may be an application of FOA signals rotation matrices according to the user head orientation.

Figure 2:
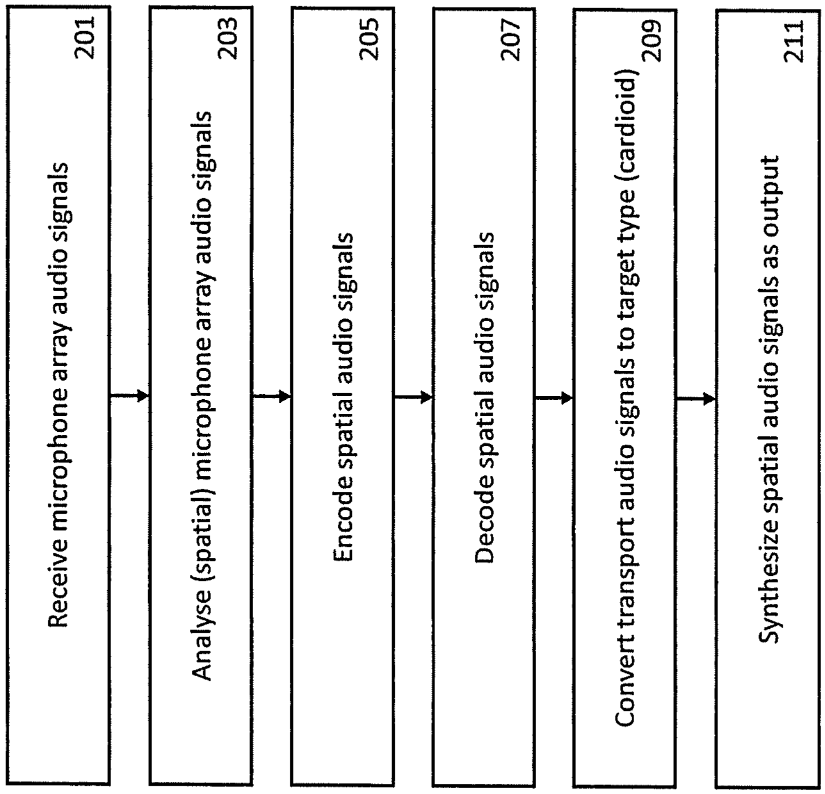
FIG. 2 shows a flow diagram of the operation of the example apparatus according to some embodiments.

The operations of this system are summarized with respect to the flow diagram as shown in FIG. 2. FIG. 2 shows for example the receiving of the microphone array audio signals as shown in step 201.

Then the flow diagram shows the analysis (spatial) of the microphone array audio signals as shown in FIG. 2 by step 203.

The generated transport audio signals (in this example spaced type transport audio signals) and the metadata may then be encoded as shown in FIG. 2 by step 205.

The transport audio signals (in this example spaced type transport audio signals) and the metadata can then be decoded as shown in FIG. 2 by step 207.

The transport audio signals can then be converted to the "target" type as shown in this example as cardioid type transport audio signals as shown in FIG. 2 by step 209.

The spatial audio signals may then be synthesized to output a suitable output format as shown in FIG. 2 by step 211.

Figure 3:
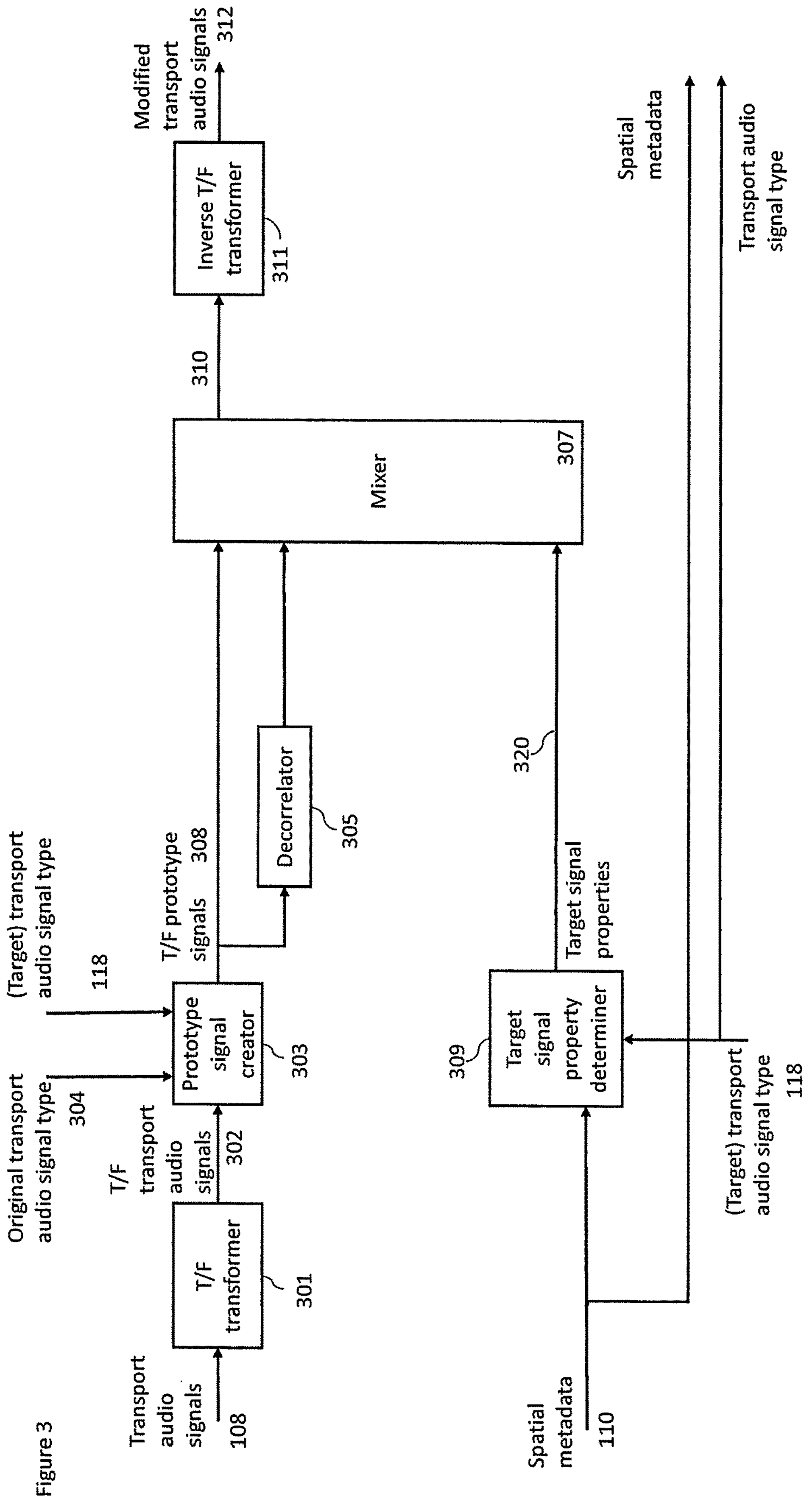
FIG. 3 shows schematically a transport audio signal type converter as shown in FIG. 1 according to some embodiments.

With respect to FIG. 3 is shown the signal type converter 111 suitable for converting a "spaced" transport audio signal type to a "cardioid" transport audio signal type.

In some embodiments the signal type converter 111 comprises a time-frequency transformer 301. The time/frequency transformer 301 is configured to receive the transport audio signals 108 and convert them to the time-frequency domain, in other words output suitable T/F-domain transport audio signals 302. Suitable transforms include, e.g., short-time Fourier transform (STFT) and complex-modulated quadrature mirror filterbank (QMF). The resulting signals are denoted as $S_i(b,n)$, where i is the channel index, b the frequency bin index, and n time index. In situations where the transport audio signals (output from the extractor and/or decoder) is already in the time-frequency domain, this may be omitted, or alternatively may contain a transform from one time-frequency domain representation to another time-frequency domain representation. The T/F-domain transport audio signals 302 can be forwarded to a prototype signal creator 303.

In some embodiments the signal type converter 111 comprises a prototype signal creator 303. The prototype signal creator 303 is configured to receive the T/F-domain transport audio signals 302. The prototype signal creator 303 is further configured to receive an indicator of the target transport audio signal type 118 and furthermore in some embodiments an indicator of the original transport audio signal type 304. The prototype signal creator 303 is then configured to output time-frequency domain prototype signals 308 to a decorrelator 305 and mixer 307. The creation of the prototype signals depends on the original and the target transport audio signal type. In this example, the original transport signal type is "spaced", and the target transport signal type is "cardioids".

The spatial metadata is determined in frequency bands k, which each involve one or more frequency bins b. In some embodiments the resolution is such that the higher frequency bands k involve more frequency bins b than the lower frequency bands, approximating the frequency selectivity properties of human hearing. However in some embodiments the resolution can be any suitable arrangement of bands into any suitable number of bins. In some embodiments the prototype signal creator 303 operates on three frequency ranges.

In this example the three frequency ranges are the following:

- The low range ($k \leq K_1$) is such that consist of bins b where the audio wavelength is considered long with respect to the microphone spacing of the transport audio signal
- The high range ($K_2 < k$) is such that consist of bins b where the audio wavelength is considered short with respect to the microphone spacing of the transport audio signal
- The mid range ($K_1 < k \leq K_2$)

The audio wavelength being long means that the signals are highly similar in the transport audio signals, and as such a difference operation (e.g. $S_1(b,n)-S_2(b,n)$) provides a signal with very small amplitude. This is likely to produce signals with a poor SNR, because the microphone noise is not attenuated at the difference signal.

Figure 5:
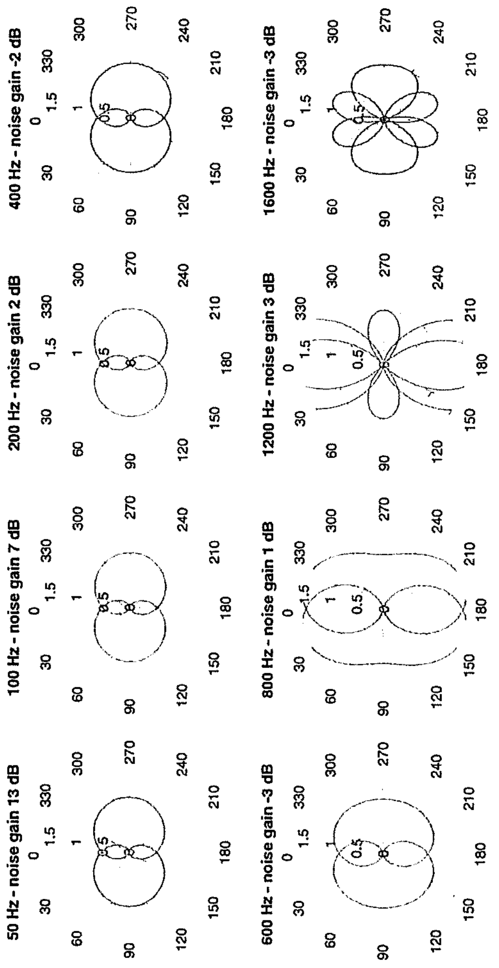
FIG. 5 shows linearly generated cardioid patters according to a first example implementation as shown in some embodiments.

The audio wavelength being short means that beamforming procedures cannot be well implemented, and spatial aliasing occurs. For example, a linear combination of the transport signals could generate for mid frequency range a beam pattern that has a shape of the cardioid. However, at high range it is not possible to generate such a pattern by linear operations. The resulting pattern would have several side lobes, as it is well known in the field of microphone array processing, and that this generated pattern would not be useful in this example. FIG. 5 for example shows what could happen if linear operations were applied at high frequencies. For example FIG. 5 shows that for frequencies above around 1 kHz that the output patterns are not as good.

The frequency ranges $K_1$ and $K_2$ can in some embodiments be determined based on the spaced microphone distance d (in meters) of the transport signal. For example, the following formulas can be used to determine frequency limits in Hz $$f_2 = \frac{c}{3d}$$

$$f_1 = \frac{c}{30d}$$

where c is the speed of sound. $K_1$ is then the highest band index where the frequency corresponding to the lowest bin index is below $f_1$. $K_2$ is then the lowest band index where the frequency corresponding to the highest bin index is above $f_2$.

The distance d can be in some cases be obtained from the transport audio signal type parameter or other suitable parameter or indicator. In other cases, the distance can be estimated. For example, inter-microphone delay values can be monitored to determine the highest highly coherent delays between the microphones, and the microphone distance can be estimated based on this highest delay value. In some embodiments a normalized cross correlation of the microphone signals as a function of frequency can be measured over a suitable time interval, and the resulting cross correlation pattern can be compared to ideal diffuse field cross correlation patterns for different distances d, and the best fitting d is then selected.

In some embodiments the prototype signal creator 303 is configured to implement the following processing operations on the low and high frequency ranges.

As the low frequency range has microphone audio signals which are highly coherent the prototype signal creator 303 is configured to generate a prototype signal by adding or combining the T/F transport audio signals together.

The prototype signal generator 303 is configured not to combine or add the T/F transport audio signals together for the high frequency range as this would generate an undesired comb filtering effect. Thus in some embodiments prototype signal generator 303 is configured to generate the prototype signal by selecting one channel (for example the first channel) of the T/F transport audio signals.

The generated prototype signal for both the high and the low frequency ranges is a single channel signal.

The prototype signal generator 303 (for low and high ranges) can then be configured to equalize the generated prototype signals using a suitable temporal smoothing. The equalization is implemented such that the output audio signals have the mean energy of signals $S_i(b,n)$.

The prototype signal generator 303 is configured to then output the mid frequency range of the T/F transport audio signals 302 as the T/F prototype signals 308 (at the mid frequency range) without any processing.

The equalized prototype signal denoted as $S_{p,mono}(b,n)$ at low and high frequency ranges and the unprocessed mid range frequency transport audio signals are output as prototype audio signals 308 to the decorrelator 305 and the mixer 307.

In some embodiments the signal type converter 111 comprises a decorrelator 305. The decorrelator 305 is configured to generate at low and high frequency ranges one incoherent decorrelated signal based on the prototype signal. At the mid frequency range the decorrelated signals are not needed. The output is provided to the mixer 307. The decorrelated signal is denoted as $S_{d,mono}(b,n)$. The decorrelated signal has ideally the same energy as $S_{p,mono}(b,n)$, but these signals are ideally mutually incoherent.

In some embodiments the signal type converter 111 comprises a target signal property determiner 309. The target signal property determiner 309 is configured to receive the spatial metadata 110 and the target transport audio signal type 118. The target signal property determiner 309 is configured to formulate a target covariance matrix using the metadata azimuth azi(k,n), elevation ele(k,n) and direct-to-total energy ratio r(k,n). For example the target signal property determiner 309 is configured to formulate left and right cardioid gains $$g_l(k,n)=0.5+0.5\ \sin(azi(k,n))\cos(ele(k,n))$$

$$g_r(k,n)=0.5-0.5\ \sin(azi(k,n))\cos(ele(k,n))$$

Then the target covariance matrix is $$C_y = \begin{bmatrix} g_l g_l & g_l g_r \\ g_l g_r & g_r g_r \end{bmatrix} r(k,n) + \begin{bmatrix} 1 & 0.5 \\ 0.5 & 1 \end{bmatrix} \frac{1}{3}(1 - r(k,n))$$

where the rightmost matrix definition relates to the energy and correlation of two cardioid signals in a diffuse field. The target covariance matrix, which are the target signal properties 320 are provided to the mixer 307.

In some embodiments the signal type converter 111 comprises a mixer 307. The mixer 307 is configured to receive the outputs from the decorrelator 305 and the prototype signal generator 303. Furthermore the mixer 307 is configured to receive the target covariance matrix as the target signal properties 320.

The mixer can be configured for the low and high frequency ranges to define the input signal to the mixing operation as combination of the prototype signal (first channel) and the decorrelated signal (second channel)

$$x(b,n) = \begin{bmatrix} S_{p,mono}(b,n) \\ S_{d,mono}(b,n) \end{bmatrix}$$

The mixing procedure can use any suitable procedure, for example the method to generate a mixing matrix based on "Optimized covariance domain framework for time-frequency processing of spatial audio", J Vilkamo, T Bäckström, A Kuntz—*Journal of the Audio Engineering Society,* 2013.

The formulated mixing matrix M (time and frequency indices temporarily omitted) can be based on the following matrices.

The target covariance matrix was, in the above, determined in a normalized form (i.e. without absolute energies), and thus the covariance matrix of the signal x can also be determined in a normalized form: The signals contained by x are incoherent but with same energy, and as such its covariance matrix can be fixed to $$C_x = \begin{bmatrix} 1 & 0 \\ 0 & 1 \end{bmatrix}.$$

A prototype matrix can be determined as $$Q = \begin{bmatrix} 1 & 0.01 \\ 1 & -0.01 \end{bmatrix}$$

that guides the generation of the mixing matrix. The rationale of these matrices and the formula to obtain a mixing matrix M based on them has been thoroughly explained in the above cited reference and are not repeated here. In short, the method is such that provides a mixing matrix M that when applied to a signal with a covariance matrix $C_x$ produces a signal with covariance matrix $C_y$, in a least-squares optimized way. Matrix Q guides the signal content in such mixing: In this example, non-decorrelated sound is primarily utilized, and when needed then the decorrelated sound with positive sign to first output channel and negative sign to the second output channel.

The mixing matrix M(k,n) can be formulated for each frequency band k, and is applied to each bin b within the frequency band k to generate the output signal $$y(b,n)=M(k,n)x(b,n).$$

The mixer 307, for the mid frequency range, has the information that a "cardioid" transport audio signal type is to be rendered, and accordingly formulates for each frequency bin (within the bands at mid frequency range) a mixing matrix $M_{mid}$ and applies it to the input signal (that was at the mid range the T/F transport audio signal) to generate the new transport audio signal.

$$y(b, n) = M_{mid}(b, n)\begin{bmatrix} S_1(b, n) \\ S_2(b, n) \end{bmatrix}$$

The mixing matrix $M_{mid}$ can in some embodiments be formulated as a function of d as follows. In this example each bin b has a centre frequency $f_b$. First, the mixer is configured to determine normalization gains:

$$g_W(f_b) = \frac{1}{2\cos(f_b \pi d / c)}$$

$$g_Y(f_b) = \frac{1}{2\sin(f_b \pi d / c)}$$

Then the mixing matrix is determined by the following matrix multiplication $$M_{mid}(b, n) = \begin{bmatrix} 0.5 & 0.5 \\ 0.5 & -0.5 \end{bmatrix} \begin{bmatrix} g_W(f_b) & g_W(f_b) \\ -i * g_Y(f_b) & i * g_Y(f_b) \end{bmatrix}$$

where the right matrix performs the conversion of the microphone frequency bin signal to (approximates of) W and Y signals, and the left matrix converts the result to cardioid signals. The formulated normalization above is such that unit gain is achieved at directions 90 and −90 degrees for the cardioid patterns, and nulls at the opposing directions. The generated patterns according to the above functions are illustrated in FIG. 5. The figure also illustrates that this linear method functions only for a limited frequency range, and for the high frequency range the other methods described above are needed.

The signal y(b, n) formulated for the mid frequency range can then be combined with the previously formulated y(b, n) for low and high frequency ranges which then can be provided to an inverse T/F transformer 311.

In some embodiments the signal type converter 111 comprises an inverse T/F transformer 311. The inverse T/F transformer 311 converts y(b, n) 310 to the time domain and output it as the modified transport audio signal 312.

Figure 4:
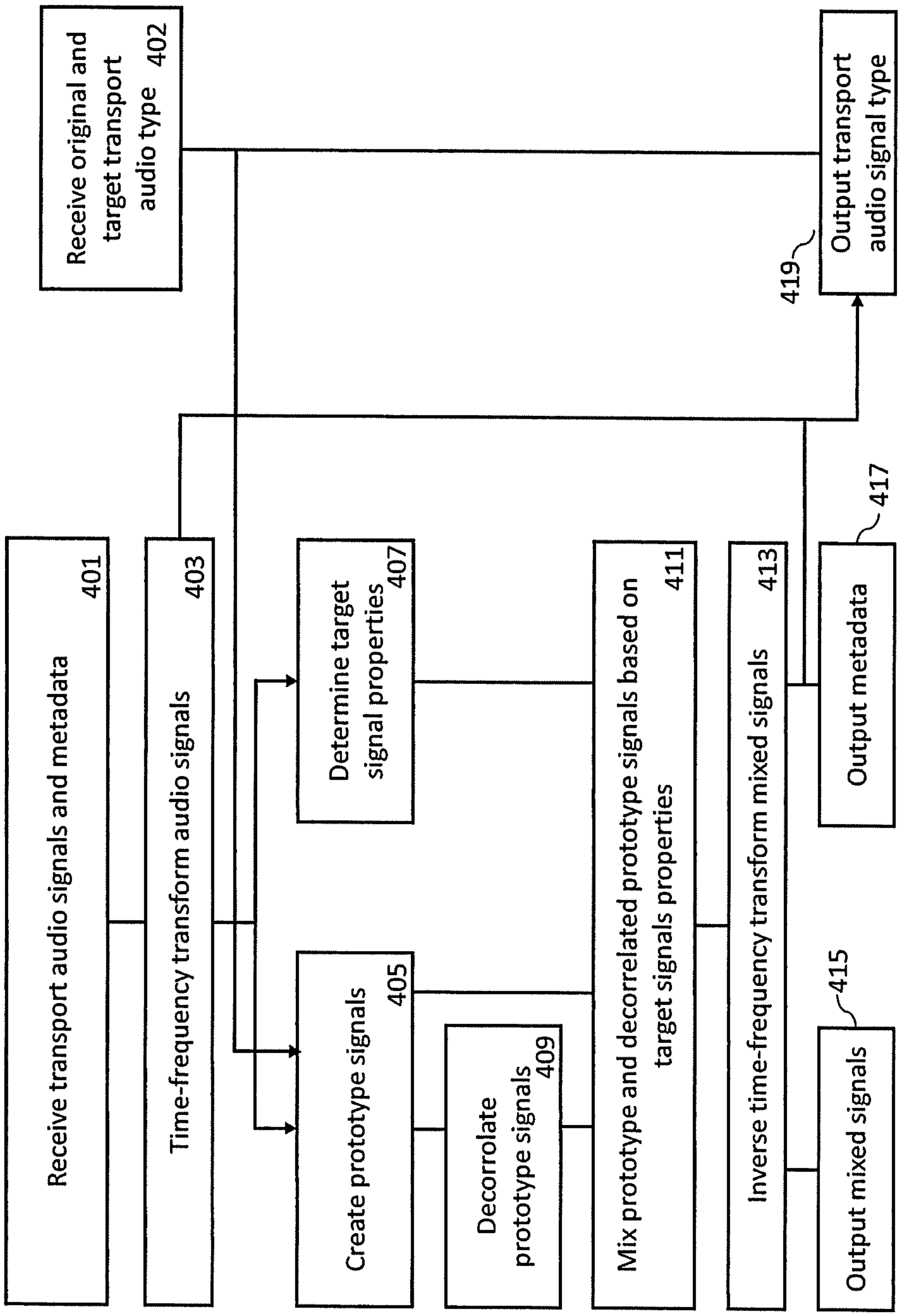
FIG. 4 shows a flow diagram of the operation of the example apparatus according to some embodiments.

With respect to FIG. 4 is shown the summary operations of the signal type converter 111.

The transport audio signals and metadata is received as shown in FIG. 4 in step 401.

The transport audio signals are then time-frequency transformed as shown in FIG. 4 by step 403.

The original and target transport audio signal type is received as shown in FIG. 4 by step 402.

The prototype transport audio signals are then created as shown in FIG. 4 by step 405.

The prototype transport audio signals are furthermore decorrelated as shown in FIG. 4 by step 409.

The target signal properties are determined as shown in FIG. 4 by step 407.

The prototype (and decorrelated prototype) signals are then mixed based on the determined target signal properties as shown in FIG. 4 by step 411.

The mixed audio signals are then inverse time-frequency transformed as shown in FIG. 4 by step 413.

The mixed time domain audio signals are then output as shown in FIG. 4 by step 415.

The metadata is furthermore output as shown in FIG. 4 by step 417.

The target audio type is output as shown in FIG. 4 by step 419 as a new "transport audio signal type" (since the transport audio signals have been modified to match this type). In some embodiments outputting the transport audio signal type could be optional (for example the output stream does not have this field or indicator identifying the signal type).

Figure 6:
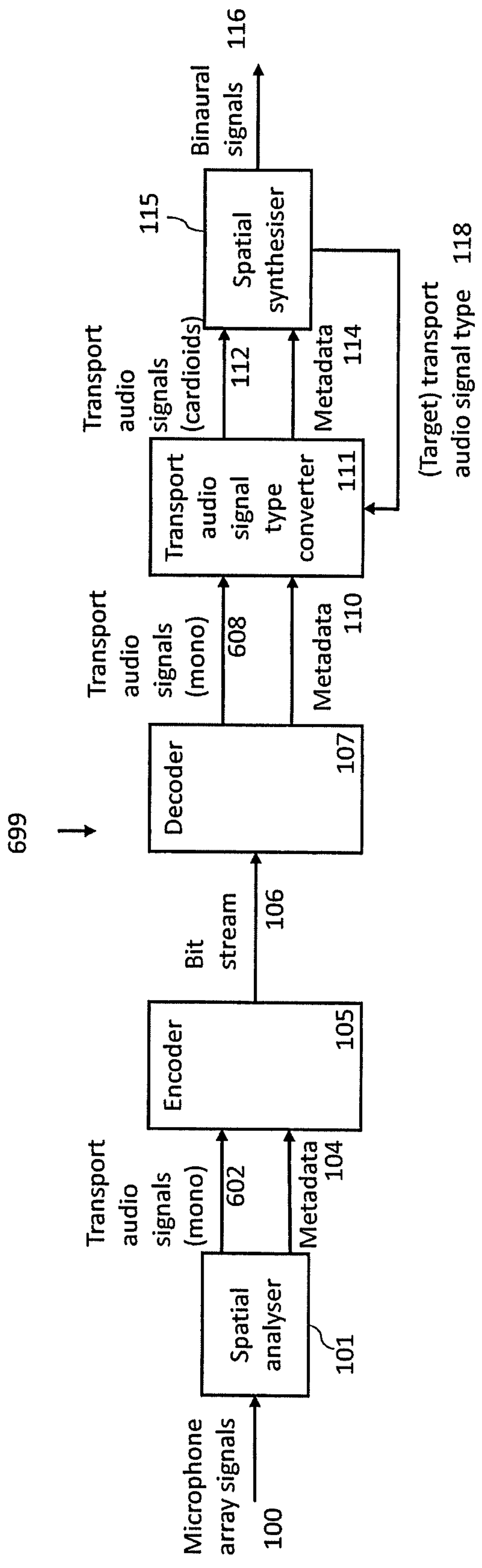
FIGS. 6 and 7 show schematically further system of apparatus suitable for implementing some embodiments.

With respect to FIG. 6 there an example apparatus and system for implementing audio capture and rendering are shown according to some embodiments (and converting a spatial audio stream with a "mono" type to a "cardioids" type of transport audio signal.

The system 699 is shown with a microphone array audio signals 100 input. In the following examples a microphone array audio signals 100 input is described, however any suitable multi-channel input (or synthetic multi-channel) format may be implemented in other embodiments.

The system 699 may comprise a spatial analyser 101. The spatial analyser 101 is configured to perform spatial analysis on the microphone signals, yielding transport audio signals 602 and metadata 104.

In some embodiments the spatial analyser and the spatial analysis may be implemented external to the system 699. For example in some embodiments the spatial metadata associated with the audio signals may be provided to an encoder as a separate bit-stream. In some embodiments the spatial metadata may be provided as a set of spatial (direction) index values.

The spatial analyser 101 may be configured to create the transport audio signals 602 in any suitable manner. For example in some embodiments the spatial analyser is configured to create a single transport audio signal. This may be useful, e.g., when the device has only one high-quality microphone, and the others are intended or otherwise suitable only for spatial analysis. In this case, the signal from the high-quality microphone is used as the transport audio signal (typically after some pre-processing, such as equalization).

The metadata can be of various forms and can contain spatial metadata and other metadata in the same manner as discussed with respect to the example as shown in FIG. 1.

In some embodiments the obtained metadata may contain metadata than the spatial metadata. For example in some embodiments the obtained metadata can be a "channel audio format" parameter that describes the transport audio signal type. In this example the "channel audio format" parameter may have the value of "mono".

The transport audio signals (of type "mono") 602 and the metadata 104 can be output from the spatial analyser 101 to the encoder 105.

In some embodiments the system 699 comprises an encoder 105. The encoder 105 can be configured to receive the transport audio signals (of type "mono") 602 and the metadata 104 from the spatial analyser 101. The encoder 105 can in some embodiments be a mobile device, user equipment, tablet computer, computer (running suitable software stored on memory and on at least one processor), or alternatively a specific device utilizing, for example, FPGAs or ASICs. The encoder can be configured to implement any suitable encoding scheme. The encoder 105 may furthermore be configured to receive the metadata and generate an encoded or compressed form of the information. In some embodiments the encoder 105 may further interleave, multiplex to a single data stream 106 or embed the metadata within encoded audio signals before transmission or storage. The multiplexing may be implemented using any suitable scheme.

The encoder could be an IVAS encoder, or any other suitable encoder. The encoder 105 thus is configured to encode the audio signals and the metadata and form a bit stream 106 (e.g., an IVAS bit stream).

The system 699 furthermore may comprise a decoder 107. The decoder 107 is configured to receive, retrieve or otherwise obtain the bitstream 106, and from the bitstream demultiplex the encoded streams and decode the audio signals to obtain the transport signals 608 (of type "mono"). Similarly the decoder 107 may be configured to receive and decode the encoded metadata 110. The decoder 107 can in some embodiments be a mobile device, user equipment, tablet computer, computer (running suitable software stored on memory and on at least one processor), or alternatively a specific device utilizing, for example, FPGAs or ASICs.

The system 699 may further comprise a signal type converter 111. The transport signal type converter 111 may be configured to obtain the transport audio signals (of type "mono" in this example) 608 and the metadata 110 and furthermore receive a transport audio signal type input 118 from a spatial synthesizer 115. The transport signal type converter 111 can be configured to convert the input transport signal type into a "target" transport signal type based on the received transport audio signal type 118 indicator from the spatial synthesizer 115.

In this example the aim is to render spatial audio (e.g., binaural audio) with these signals using the spatial synthesizer 115. However, the spatial synthesizer 115 in this example accepts only spatial audio streams in which the transport audio signals are of type "cardioids". In other words the spatial synthesizer expects for example two coincident cardioids pointing to ±90 degrees and is configured to process any two-signal input accordingly. Hence, the spatial audio stream from the decoder cannot be used directly to achieve a correct rendering, but, instead, the transport audio signal type converter 111 is used between the decoder 107 and the spatial synthesizer 115.

In this example, the "target" type is coincident cardioids pointing to ±90 degrees (this is merely an example, it could be any kind of type). In addition, if the metadata has a field describing the transport audio signal type (e.g., a channel audio format metadata parameter), it can be configured to change this indicator or parameter to indicate the new transport audio signal type (e.g., "cardioids").

The modified transport audio signals (for example type "cardioids") 112 and (possibly modified) metadata 114 are forwarded to a spatial synthesizer 115.

The signal type converter 111 can implement the conversion for all frequencies in the same manner as described in context of FIG. 3 for the low and the high frequency ranges. In such embodiments the signal type converter 111 is configured to generate a single-channel prototype signal, and then process the converted output using the prototype signal. In this context of the system 699, the transport audio signal is already a single channel signal, and can be used as the prototype signal and the conversion processing can be performed for all frequencies as described in context of the example shown in FIG. 3 for the low and the high frequency ranges.

The modified transport audio signals (now of type "cardioids") and (possibly modified) metadata can then be forwarded to the spatial synthesiser which renders spatial audio (e.g., binaural audio) using the spatial audio stream it received.

Figure 7:
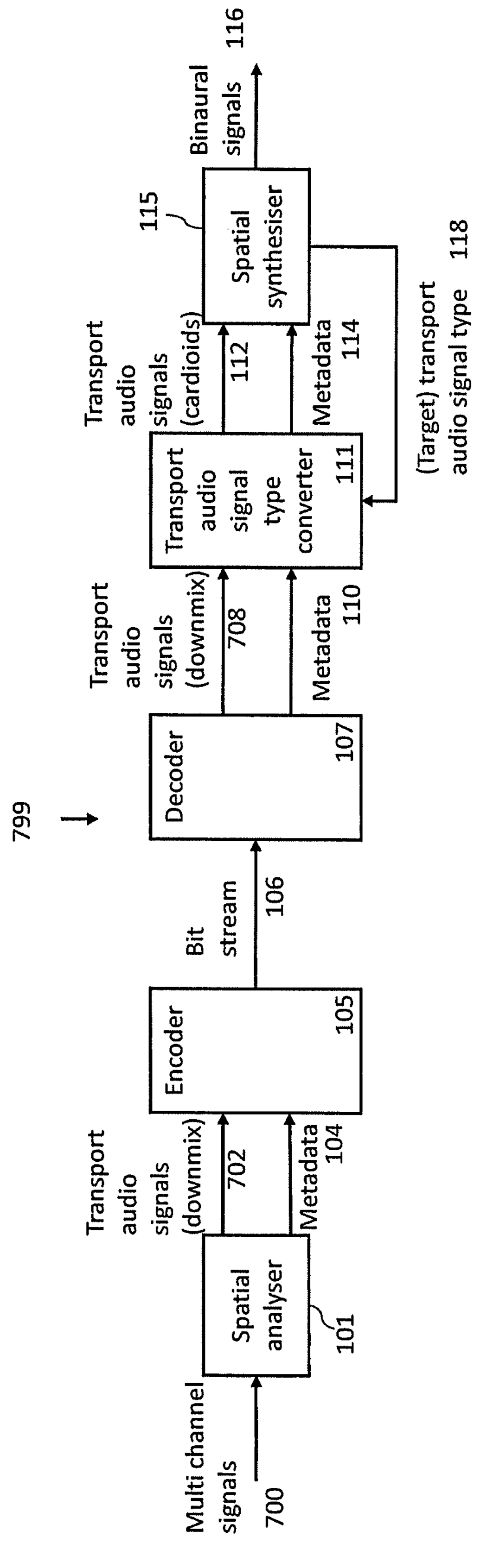

With respect to FIG. 7 an example apparatus and system for implementing audio capture and rendering is shown according to some embodiments (and converting a spatial audio stream with a "downmix" type to a "cardioids" type of transport audio signal).

The system 799 is shown with a multichannel audio signals 700 input.

The system 799 may comprise a spatial analyser 101. The spatial analyser 101 is configured to perform analysis on the multichannel audio signals, yielding transport audio signals 702 and metadata 104.

In some embodiments the spatial analyser and the spatial analysis may be implemented external to the system 799. For example in some embodiments the spatial metadata associated with the audio signals may be provided to an encoder as a separate bit-stream. In some embodiments the spatial metadata may be provided as a set of spatial (direction) index values.

The spatial analyser 101 may be configured to create the transport audio signals 702 by downmixing. A simple way is to create the transport audio signals 702 is to use a static downmix matrix (e.g., $M_{left}=[1, 0, \sqrt{0.5}, \sqrt{0.5}, 1, 0]$ and $M_{right}=[0, 1, \sqrt{0.5}, \sqrt{0.5}, 0, 1]$) used for 5.1 multichannel signals. In some embodiments active or adaptive downmixing may be implemented.

The metadata can be of various forms and can contain spatial metadata and other metadata in the same manner as discussed with respect to the example as shown in FIG. 1.

In some embodiments the obtained metadata may contain metadata than the spatial metadata. For example in some embodiments the obtained metadata can be a "Channel audio format" parameter that describes the transport audio signal type. In this example the "channel audio format" parameter may have the value of "downmix".

The transport audio signals (of type "downmix") 702 and the metadata 104 can be output from the spatial analyser 101 to the encoder 105.

In some embodiments the system 799 comprises an encoder 105. The encoder 105 can be configured to receive the transport audio signals (of type "downmix") 702 and the metadata 104 from the spatial analyser 101. The encoder 105 can in some embodiments be a mobile device, user equipment, tablet computer, computer (running suitable software stored on memory and on at least one processor), or alternatively a specific device utilizing, for example, FPGAs or ASICs. The encoder can be configured to implement any suitable encoding scheme. The encoder 105 may furthermore be configured to receive the metadata and generate an encoded or compressed form of the information. In some embodiments the encoder 105 may further interleave, multiplex to a single data stream 106 or embed the metadata within encoded audio signals before transmission or storage. The multiplexing may be implemented using any suitable scheme.

The encoder could be an IVAS encoder, or any other suitable encoder. The encoder 105 thus is configured to encode the audio signals and the metadata and form a bit stream 106 (e.g., an IVAS bit stream).

The system 799 furthermore may comprise a decoder 107. The decoder 107 is configured to receive, retrieve or otherwise obtain the bitstream 106, and from the bitstream demultiplex the encoded streams and decode the audio signals to obtain the transport signals 708 (of type "downmix"). Similarly the decoder 107 may be configured to receive and decode the encoded metadata 110. The decoder 107 can in some embodiments be a mobile device, user equipment, tablet computer, computer (running suitable software stored on memory and on at least one processor), or alternatively a specific device utilizing, for example, FPGAs or ASICs.

The system 799 may further comprise a signal type converter 111. The transport signal type converter 111 may be configured to obtain the transport audio signals (of type "downmix" in this example) 708 and the metadata 110 and furthermore receive a transport audio signal type input 118 from a spatial synthesizer 115. The transport signal type converter 111 can be configured to convert the input transport signal type into a target transport signal type based on the received transport audio signal type 118 indicator from the spatial synthesizer 115.

In this example the aim is to render spatial audio (e.g., binaural audio) with these signals using the spatial synthesizer 115. However, the spatial synthesizer 115 in this example accepts only spatial audio streams in which the transport audio signals are of type "cardioids".

The modified transport audio signals (for example type "cardioids") 112 and (possibly modified) metadata 114 are forwarded to a spatial synthesizer 115.

The signal type converter 111 can implement the conversion by first generating W and Y signals based on the downmix audio signals, and then mix them to generate the cardioid output.

For all frequency bins, a linear W and Y signal generation is performed. When $S_1(b,n)$ and $S_2(b,n)$ are the left and right downmix T/F signals, the temporary (non-energy-normalized) W and Y signals are generated by $$S_W(b,n)=S_1(b,n)+S_2(b,n),$$

$$S_Y(b,n)=S_1(b,n)-S_2(b,n).$$

Then the energy estimates of these signals in frequency bands are formulated as $$E_W(k,\ n)=\sum_{b\in k}|S_W(b,\ n)|^2,$$

$$E_Y(k,\ n)=\sum_{b\in k}|S_y(b,\ n)|^2.$$

Then also an overall energy estimate is formulated $$E_o(k,n)=\sum_{b\in k}|S_1(b,n)|^2+|S_2(b,n)|^2.$$

After this the converter can formulate target energies for W and Y signals.

$$T_W(k,n)=E_O(k,n)$$

$$T_Y(k,n)=E_O(k,n)r(k,n)|\sin(azi(k,n))\cos(ele(k,n))|^2+E_O(k,n)(1-r(k,n))^{1/3}$$

$T_Y$, $T_W$, $E_Y$ and $E_W$ may then be averaged over a suitable temporal interval, e.g., by using IIR averaging. The processing matrix for band k then is $$M_c(k,n)=\begin{bmatrix}0.5 & 0.5\\ 0.5 & -0.5\end{bmatrix}\begin{bmatrix}\sqrt{T_W/E_W} & 0\\ 0 & \sqrt{T_Y/E_Y}\end{bmatrix}$$

And the cardioid signals for bins b within each band k are processed as $$y(b,n)=M_c(k,n)\begin{bmatrix}S_W(b,n)\\ S_Y(b,n)\end{bmatrix}$$

The modified transport audio signals (now of type "cardioids") and (possibly) modified metadata can then be forwarded to the spatial synthesiser which renders spatial audio (e.g., binaural audio) using the spatial audio stream it received.

These examples are examples only and the converter can be configured to change the transport audio signal type from a type different from that described above to another different types.

In implementing these embodiments there may be the following advantages: spatializers (or any other systems) accepting only certain transport audio signal type can be used with audio streams of any transport audio signal type by first transforming the transport audio signal type using the present invention. Additionally as these embodiments allow flexible transformation of the transport audio signal type, the original spatial audio stream can be created and/or stored with any transport audio signal type without worrying about whether it can be later used with certain systems.

In some embodiments the input transport audio signal type could be detected (instead of signalled), for example in the manner as discussed in GB patent application 19042361.3. For example in some embodiments the transport audio signal type converter 111 can be configured to either receive or determine otherwise the transport audio signal type.

In some embodiments, the transport audio signals could be first-order Ambisonic (FOA) signals (with or without spatial metadata). These FOA signals can be converted to further transport audio signals of the type "cardioids". This conversion can for example be performed according to the following processing:

$$S_1(b,n)=0.5S_W(b,n)+0.5S_Y(b,n),$$

$$S_2(b,n)=0.5S_W(b,n)-0.5S_Y(b,n).$$

Figure 8:
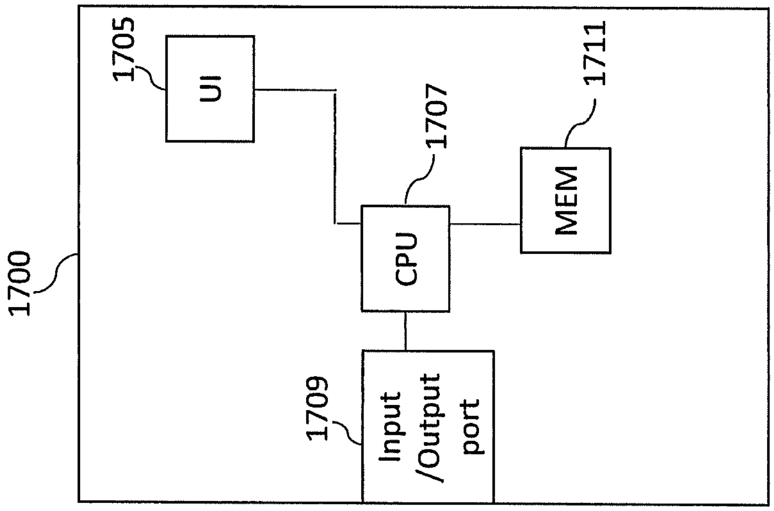
FIG. 8 shows an example device suitable for implementing the apparatus shown in previous figures.

With respect to FIG. 8 an example electronic device which may be used as any of the apparatus parts of the system as described above. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals.

In some embodiments the device 1700 may be employed as at least part of the synthesis device. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one non-transitory memory including a computer program code, the at least one memory and the computer program code configured to, with the at least one processor, cause the apparatus at least to:

obtain at least one audio stream, wherein the at least one audio stream comprises one or more transport audio signals, wherein the one or more transport audio signals is a first type of transport audio signals in a format;

obtain an indicator representing an at least partially different second type of transport audio signals in the format, wherein the indicator is obtained from a synthesizer configured to perform rendering to a user, and wherein the at least partially different second type comprises a target transport audio signal type; and process the one or more transport audio signals of the at least one audio stream based, at least partially, on the indicator to generate one or more processed transport audio signals that is the target transport audio signal type.

2. The apparatus as claimed in claim 1, wherein at least one of the first type or the at least partially different second type is associated with at least one of:

an origin of the one or more transport audio signals; or simulated origin of the one or more transport audio signals.

3. The apparatus as claimed in claim 1, wherein the indicator is obtained from a renderer configured to receive the one or more processed transport audio signals and render the one or more processed transport audio signals, wherein the renderer comprises the synthesizer, wherein the renderer is spaced from the apparatus.

4. The apparatus as claimed in claim 1, further configured to:

provide the one or more processed transport audio signals for rendering;

generate the indicator associated with the at least partially different second type; and provide the indicator as additional metadata with the one or more processed transport audio signals for the rendering.

5. The apparatus as claimed in claim 1, further configured to determine the first type.

6. The apparatus as claimed in claim 5, wherein the at least one audio stream further comprises a further indicator identifying the first type, and wherein the apparatus is configured to determine the first type based on the further indicator.

7. The apparatus as claimed in claim 5, further configured to determine the first type based on an analysis of the one or more transport audio signals.

8. The apparatus as claimed in claim 1, wherein the processing of the one or more transport audio signals of the at least one audio stream comprises the at least one memory and the computer program code are further configured to, with the at least one processor, cause the apparatus to:

generate at least one prototype signal based on the one or more transport audio signals of the at least one audio stream, the first type and the at least partially different second type;

determine at least one transport audio signal property of the one or more processed transport audio signals; and mix the at least one prototype signal and a decorrelated version of the at least one prototype signal based on the determined at least one transport audio signal property to generate the one or more processed transport audio signals.

9. The apparatus as claimed in claim 1, wherein the first type is at least one of:

a capture microphone arrangement;

a capture microphone separation distance;

a capture microphone parameter;

a transport channel identifier;

a cardioid audio signal type;

a spaced audio signal type;

a downmix audio signal type;

a coincident audio signal type; or a transport channel arrangement.

10. The apparatus as claimed in claim 1, wherein the at least one memory and the computer program code are further configured to, with the at least one processor, cause the apparatus to one of:

convert the one or more processed transport audio signals into an Ambisonic audio signal representation for rendering;

convert the one or more processed transport audio signals into a binaural audio signal representation for rendering; or convert the one or more processed transport audio signals into a multichannel audio signal representation for rendering.

11. The apparatus as claimed in claim 1, wherein the at least one audio stream comprises spatial metadata associated with the one or more transport audio signals.

12. The apparatus as claimed in claim 11, further configured to provide the one or more processed transport audio signals and the spatial metadata associated with the one or more transport audio signals for rendering, wherein the apparatus comprises the synthesizer.

13. A method comprising:

obtaining at least one audio stream, wherein the at least one audio stream comprises one or more transport audio signals, wherein the one or more transport audio signals is a first type of transport audio signals in a format;

obtaining an indicator representing an at least partially different second type of transport audio signals in the format, wherein the indicator is obtained from a synthesizer configured to perform rendering to a user, and wherein the at least partially different second type comprises a target transport audio signal type; and processing the one or more transport audio signals of the at least one audio stream based, at least partially, on the indicator to generate one or more processed transport audio signals that is the target transport audio signal type.

14. The method as claimed in claim 13, wherein at least one of the first type or the at least partially different second type is associated with at least one of:

an origin of the one or more transport audio signals; or simulated origin of the one or more transport audio signals.

15. The method as claimed in claim 13, wherein the indicator is obtained from a renderer configured to receive the one or more processed transport audio signals and render the one or more processed transport audio signals, wherein the renderer comprises the synthesizer.

16. The method as claimed in claim 13, further comprising providing the one or more processed transport audio signals for rendering.

17. The method as claimed in claim 13, wherein the processing of the one or more transport audio signals further comprises:

generating at least one prototype signal based on the one or more transport audio signals of the at least one audio stream, the first type and the at least partially different second type;

determining at least one transport audio signal property of the one or more processed transport audio signals; and mixing the at least one prototype signal and a decorrelated version of the at least one prototype signal based on the determined at least one transport audio signal property for generating the one or more processed transport audio signals.

18. The method as claimed in claim 13, wherein the at least one audio stream comprises spatial metadata associated with the one or more transport audio signals and the method further comprising providing the one or more processed transport audio signals and the spatial metadata associated with the one or more transport audio signals for rendering.

19. A non-transitory computer-readable medium comprising program instructions stored thereon for performing at least the following:

causing obtaining of at least one audio stream, wherein the at least one audio stream comprises one or more transport audio signals, wherein the one or more transport audio signals is a first type of transport audio signals in a format;

causing obtaining of an indicator representing an at least partially different second type of transport audio signals in the format, wherein the indicator is obtained from a synthesizer configured to perform rendering to a user, and wherein the at least partially different second type comprises a target transport audio signal type; and processing the one or more transport audio signals of the at least one audio stream based, at least partially, on the indicator to generate one or more processed transport audio signals that is the target transport audio signal type.

* * * * *